United States Patent
Tatton

(10) Patent No.: US 10,047,625 B2
(45) Date of Patent: Aug. 14, 2018

(54) FAN BLADE ROOT INTEGRATED SEALING SOLUTION

(71) Applicant: UNITED TECHNOLOGIES CORPORATION, Farmington, CT (US)

(72) Inventor: Royce E. Tatton, Firth, ID (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 391 days.

(21) Appl. No.: 14/401,004

(22) PCT Filed: Feb. 13, 2014

(86) PCT No.: PCT/US2014/016182
§ 371 (c)(1),
(2) Date: Nov. 13, 2014

(87) PCT Pub. No.: WO2014/149260
PCT Pub. Date: Sep. 25, 2014

(65) Prior Publication Data
US 2015/0104315 A1    Apr. 16, 2015

Related U.S. Application Data

(60) Provisional application No. 61/933,421, filed on Jan. 30, 2014, provisional application No. 61/790,145, filed on Mar. 15, 2013.

(51) Int. Cl.
*F01D 11/00* (2006.01)
*F01D 5/30* (2006.01)
(Continued)

(52) U.S. Cl.
CPC .......... *F01D 11/008* (2013.01); *F01D 5/3007* (2013.01); *F01D 11/006* (2013.01);
(Continued)

(58) Field of Classification Search
CPC ........ F04D 29/08; F04D 29/38; F04D 29/329; F04D 29/083; F04D 29/322; F04D 29/324; F04D 29/34; F01D 5/30
See application file for complete search history.

(56) References Cited

U.S. PATENT DOCUMENTS 4,045,149 A * 8/1977 Ravenhall ................ F01D 5/30
                                                 416/135
5,112,193 A    5/1992 Greer et al.
(Continued)

FOREIGN PATENT DOCUMENTS

JP        10252413 A       9/1998

OTHER PUBLICATIONS

English Abstract JP10-252413.
(Continued)

*Primary Examiner* — Richard Edgar
*Assistant Examiner* — Michael Sehn
(74) *Attorney, Agent, or Firm* — Cantor Colburn LLP

(57) ABSTRACT

A gas turbine engine, a fan section for a gas turbine engine, and a method for assembling a fan section of a gas turbine engine are disclosed. The fan section may include a fan hub having a slot, a spinner having a castellated spinner seal, a fan blade including an airfoil extending from a root to a tip, wherein the airfoil has a leading edge and the root is received in the slot, and a platform secured to the fan hub and arranged between adjacent fan blades. The fan section may further include a flap seal having a base secured to a side of the platform, and a flap integral with and extending from the base portion and canted toward the root and engaging the blade, the seal trimmed back from the leading edge of the airfoil.

20 Claims, 5 Drawing Sheets

(51) Int. Cl.
*F04D 29/08* (2006.01)
*F04D 29/32* (2006.01)

(52) U.S. Cl.
CPC ......... *F04D 29/083* (2013.01); *F04D 29/322* (2013.01); *F01D 5/3053* (2013.01); *F05D 2220/36* (2013.01); *F05D 2240/80* (2013.01); *Y02T 50/673* (2013.01)

(56) References Cited

U.S. PATENT DOCUMENTS

| | | | |
|---|---|---|---|
| 6,086,329 A | 7/2000 | Tomita et al. | |
| 6,161,839 A * | 12/2000 | Walton | F01D 17/105 277/345 |
| 6,217,283 B1 | 4/2001 | Ravenhall et al. | |
| 6,634,863 B1 * | 10/2003 | Forrester | F01D 5/06 416/193 A |
| 8,246,309 B2 * | 8/2012 | Le Hong | F01D 5/3007 416/220 R |
| 2010/0047077 A1 * | 2/2010 | Daniels | B64F 1/005 416/244 A |
| 2010/0284816 A1 | 11/2010 | Propheter-Hinckley et al. | |
| 2010/0329873 A1 | 12/2010 | Ruba et al. | |
| 2011/0052398 A1 | 3/2011 | Fulayter et al. | |
| 2012/0244007 A1 * | 9/2012 | Mason | F01D 11/008 416/235 |
| 2013/0309073 A1 * | 11/2013 | Brown | F01D 5/3007 415/173.1 |

OTHER PUBLICATIONS

European Search Report for Application No. EP 14 76 9841.
International Search Report and Written Opinion for International Application No. PCT/US2014/016182.

* cited by examiner

FAN BLADE ROOT INTEGRATED SEALING SOLUTION

CROSS-REFERENCE TO RELATED APPLICATION

This application is a U.S. National Stage under 35 U.S.C. § 371 of International Patent Application PCT/US14/16182 filed on Feb. 13, 2014, and claims priority under 35 U.S.C. § 119(e) to U.S. Provisional Application No. 61/933,421 filed on Jan. 30, 2014 and U.S. Provisional Application No. 61/790,145, filed on Mar. 15, 2013.

TECHNICAL FIELD OF THE DISCLOSURE

The present disclosure relates to gas turbine engines and, more particularly, to a seal arrangement for a fan section of a gas turbine engine.

BACKGROUND OF THE DISCLOSURE

Gas turbine engines, such as those used to power modern commercial and military aircraft, may include a fan section. The fan section may be used to draw ambient air into the gas turbine engine using large fan blades. It is imperative to the design of the gas turbine engine to produce maximum airflow throughout the engine by limiting the airflow leakage throughout the fan section. Therefore, components of the fan section may be designed to limit the loss of airflow from a main flowpath through the fan.

The fan section may include platforms between adjacent fan blades that are supported by a fan hub to which the blades are secured. Typically, the platforms include seals adhered to platform walls adjacent to the exterior airfoil surface of the fan blades. Such seals may obstruct gaps between the platforms and the fan blades to provide a more aerodynamic inner flow path surface by eliminating airflow leakage at the slots between the fan blade and the platform.

Platform seal designs may include flap seals. A flap seal may have flaps of a variety of shapes which are angled toward the root of the fan blade. As a result, the platforms may be installed more easily from a position radially outward from the fan hub since the flaps will deflect inward, away from the fan blade during installation. The flaps may load in the radially outward direction during engine operation, which may improve sealing against an adjacent wall of the fan blade.

However, in some gas turbine fan sections, a spinner seal abutted aft of the spinner may be included with a castellation to further reduce airflow leakage. When abutted to the fan hub, the spinner seal may interface with the flap seals of the platforms of the fan hub and the forward face of the fan blade root. Therefore, a proper sealing solution between a spinner seal, respective flap seals associated with fan hub platforms, and the respective fan blade root is needed.

SUMMARY OF THE DISCLOSURE

In accordance with one aspect of the disclosure, a fan section for a gas turbine engine is disclosed. The fan section may include a fan hub having a slot, a spinner having a castellated spinner seal, a fan blade including an airfoil extending from a root to a tip, wherein the airfoil has a leading edge and the root is received in the slot, and a platform secured to the fan hub and arranged between adjacent fan blades. The fan section may further include a flap seal having a base secured to a side of the fan platform, and a flap integral with and extending from the base portion and canted toward the root and engaging the blade, the seal trimmed back from the leading edge of the airfoil.

In a further refinement, the castellated spinner seal may be contoured to fit the blade root and the flap seal.

In a refinement, the flap seal may have a generally U-shaped cross section.

In a refinement, the flap seal may have a generally Y-shaped cross section

In a refinement, the flap seal may have a generally L-shaped cross section.

In a refinement, the flap seal may be constructed from an elastomeric material.

In a further refinement, the elastomeric material may be a silicone rubber.

In accordance with another aspect of the disclosure, a method for assembling a fan section of a gas turbine engine is disclosed. The fan section may have a spinner with castellated spinner seal, a fan hub section, a fan blade including an airfoil extending from a root to a tip, wherein the airfoil has a leading edge, a platform arranged between adjacent fan blades, and a flap seal having a base and a flap integral with and extending from the base portion and canted toward the root and engaging the fan blade, the seal trimmed back from the leading edge of the airfoil. The method may include positioning the fan blade, wherein the root of the fan blade is received in the slot, securing the platform to the fan hub, and securing the base of the seal to opposing sides of the fan blade.

In a refinement, the method may further include extending the flap seal about a perimeter of the airfoil.

In a further refinement, the perimeter may include pressure and suction sides and leading and trailing edges.

In a refinement, the flap seal may generally be L-shaped.

In a refinement, the method may further include covering the flap seal in a fabric, the fabric adhered to the platform.

In a further refinement, the method may further include designing the castellated spinner seal to fit the blade root and the flap seal.

In accordance with another aspect of the disclosure, a gas turbine engine is disclosed. The gas turbine engine may include a fan assembly section, the fan assembly section including a fan hub having a slot, a spinner having a castellated spinner seal, a fan blade including an airfoil extending from a root to a tip, the airfoil having a leading edge, the root received in the slot, a platform secured to the fan hub and arranged between adjacent fan blades, and a flap seal having a base secured to opposing sides of the fan platform, and a flap integral with and extending from the base portion and canted toward the root and engaging the blade, the seal trimmed back from the leading edge of the airfoil. The gas turbine engine may further include a compressor section downstream of the fan assembly section, a combustor section downstream of the compressor section, and a turbine section downstream of the combustor section.

In a refinement, the flap seal may generally be L-shaped.

In a further refinement, the castellated spinner seal may be contoured to fit the blade root and the flap seal.

In a refinement, the flap seal may be constructed from an elastomeric material.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE DISCLOSURE

Figure 1:
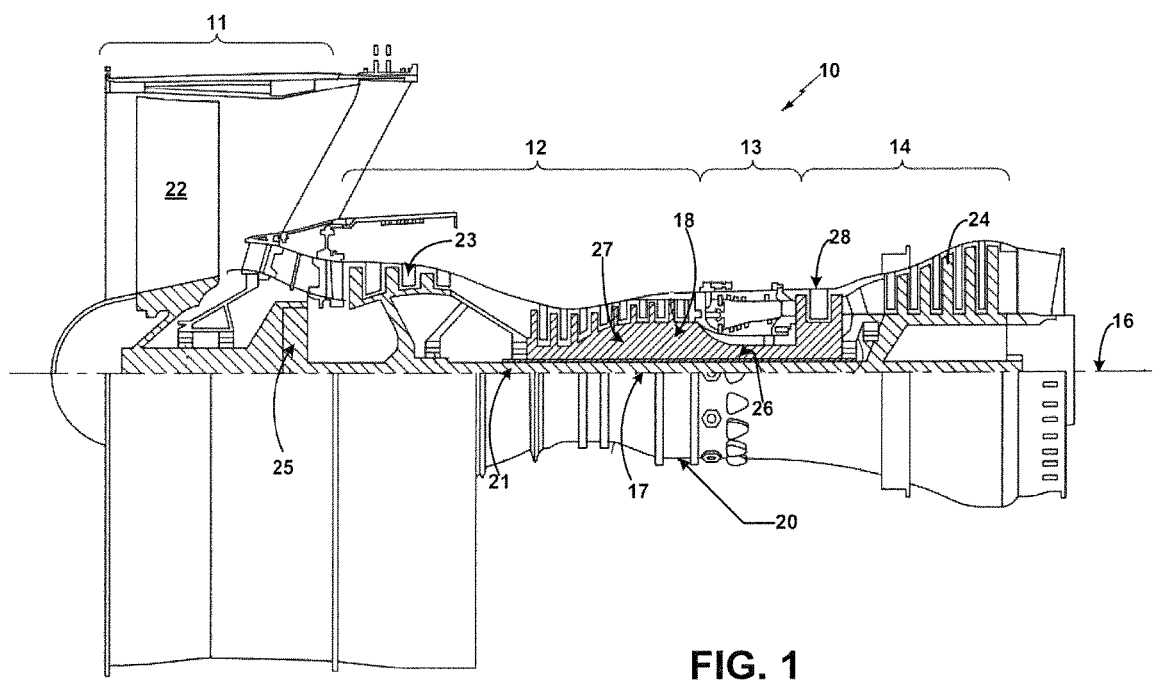
FIG. 1 is a cross-sectional view of a gas turbine engine constructed in accordance with the present disclosure.

Referring to the drawings, and with specific reference to FIG. 1, a gas turbine engine constructed in accordance with the present disclosure is generally referred to by reference numeral 10. Such a gas turbine engine 10 can be used for any number of different applications including, but not limited to, generation of aircraft thrust and land-based power. Moreover, it is to be understood that the sectional view provided in FIG. 1 is included simply to provide a basic understanding of the various sections in a gas turbine engine, and not to limit the invention thereto. The present disclosure extends to all types of gas turbine engines used in all types of applications.

The gas turbine engine 10 may have a fan section 11, the fan section 11 drawing in ambient air and directing the ambient air to a compressor section 12. The incoming air is greatly compressed by the compressor section 12 and directed to a combustor 13 where it is mixed with fuel and combusted. The products of that combustion, in the form of very hot and expanding gases, are directed to a turbine section 14 shown to be downstream of the combustor section 13. The turbine section 14 and/or compressor section 12 may each be comprised of a plurality of blades radially extending from a shaft forming rotating sections or rotors. A plurality of vanes may radially extend inwardly from a static section or stator, and are intermeshed with the plurality of blades. In so doing, it can be seen that the turbine section 14, compressor section 12, and fan section 11 all revolve around a central engine axis 16.

Further, the gas turbine engine 10 may include a low spool 17 and a high spool 18 mounted for rotation about the central engine axis 16 relative to an engine case structure 20. The low spool 17 may include an inner shaft 21 that interconnects to a fan 22, a low pressure compressor 23 ("LPC") and a low pressure turbine 24 ("LPT"). The inner shaft 21 may drive the fan 22 directly or through a geared architecture 25 to drive the fan at a lower speed than the low spool 17. The high spool 18 may include an outer shaft 26 that interconnects a high pressure compressor 27 ("HPC") and high pressure turbine ("HPT") 28. The combustor 13 is arranged between the HPC 27 and the HPT 28. The inner shaft 21 and the outer shaft may be concentric and rotate about the central engine axis 16 which is collinear with their respective longitudinal axes.

Air within the gas turbine engine 10 may be compressed by the LPC 23 and/or the HPC 27. Said air may then be mixed with fuel and burned within the combustor 13 and then may be expanded throughout the HPT 28 and/or the LPT 24. The LPT 24 and/or the HPT 54 may rotationally drive the low spool 17 and the high spool 18, respectively, in response to the expansion of the fuel/air mixture.

Figure 2:
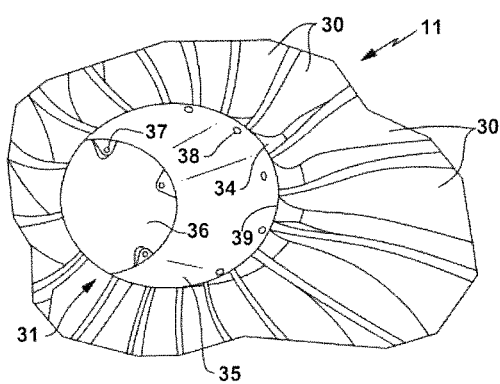
FIG. 2 is a perspective view of a portion of a fan section of the gas turbine engine of claim 1.
Figure 3:
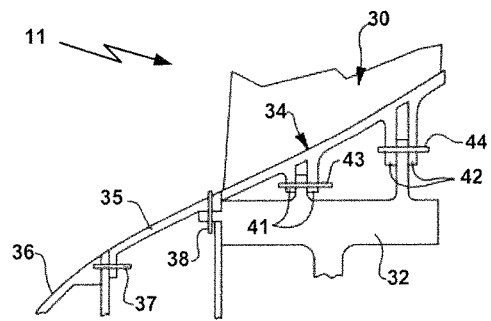
FIG. 3 is a cross-sectional side view of the portion of the fan section of FIG. 2.

Referring to FIGS. 2 and 3 which illustrate a fan section 11 which, generally, may include multiple circumferentially arranged fan blades 30. The fan blades 30 may include non-integral, discrete platforms 34, or spacers, arranged between adjacent fan blades 30.

As seen in the cross-sectional side view of the fan section 11 in FIG. 3, the fan blades 30 may be mounted to a fan hub 32. A nose cone 31 may be arranged forward of the fan blades 30 to provide an aerodynamic inner flowpath through the fan section 11 along with the platforms 34. The nose cone 31 may be provided by a spinner 35 secured to the fan hub 32 by fasteners 38. Additionally, a cap 36 may be secured to the spinner 35 by fasteners 37. The platforms 34 of the fan section 11 may include first flanges 41 and second flanges 42 secured to corresponding attachment features on the fan hub 32 respectively by fasteners 43 and fasteners 44.

Figure 4:
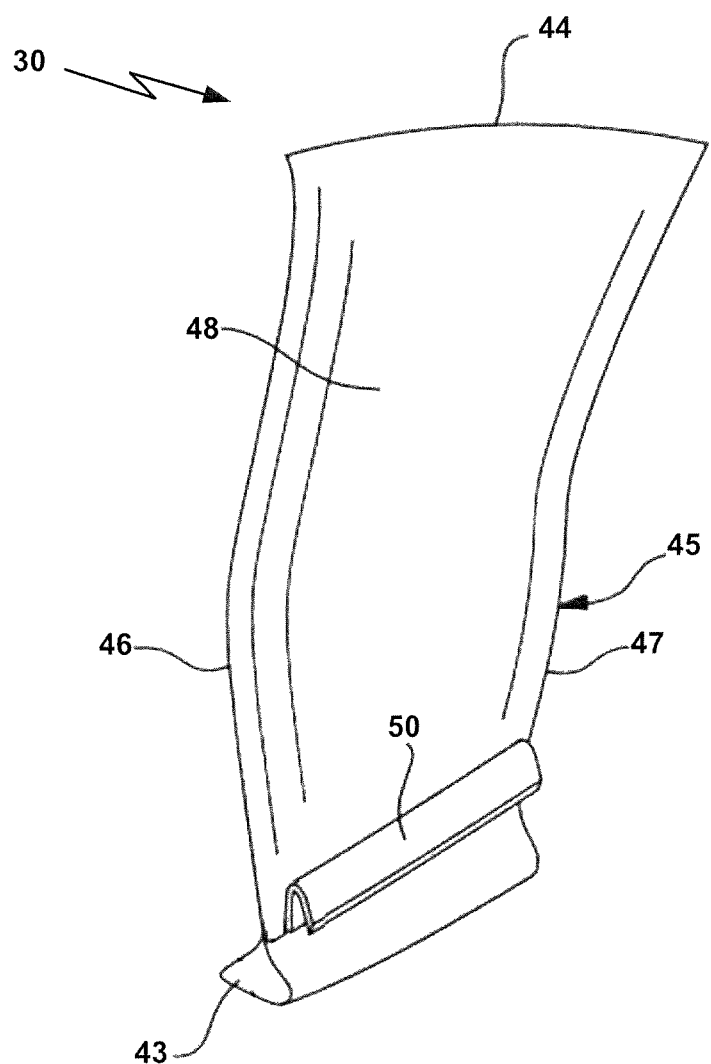
FIG. 4 is a perspective view of an example fan blade for the gas turbine engine of FIG. 1, the fan blade having a flap seal.

Turning to FIG. 4, a fan blade 30 is shown having a root 43. The fan blade may include an airfoil 45, the airfoil extending from the root 43 to a tip 44 of the fan blade 30. Additionally, the airfoil 45 may extend from a leading edge 46 to a trailing edge 47. The airfoil 45 may further be spaced apart by a pressure side and a suction side to provide an exterior surface 48.

Figure 5:
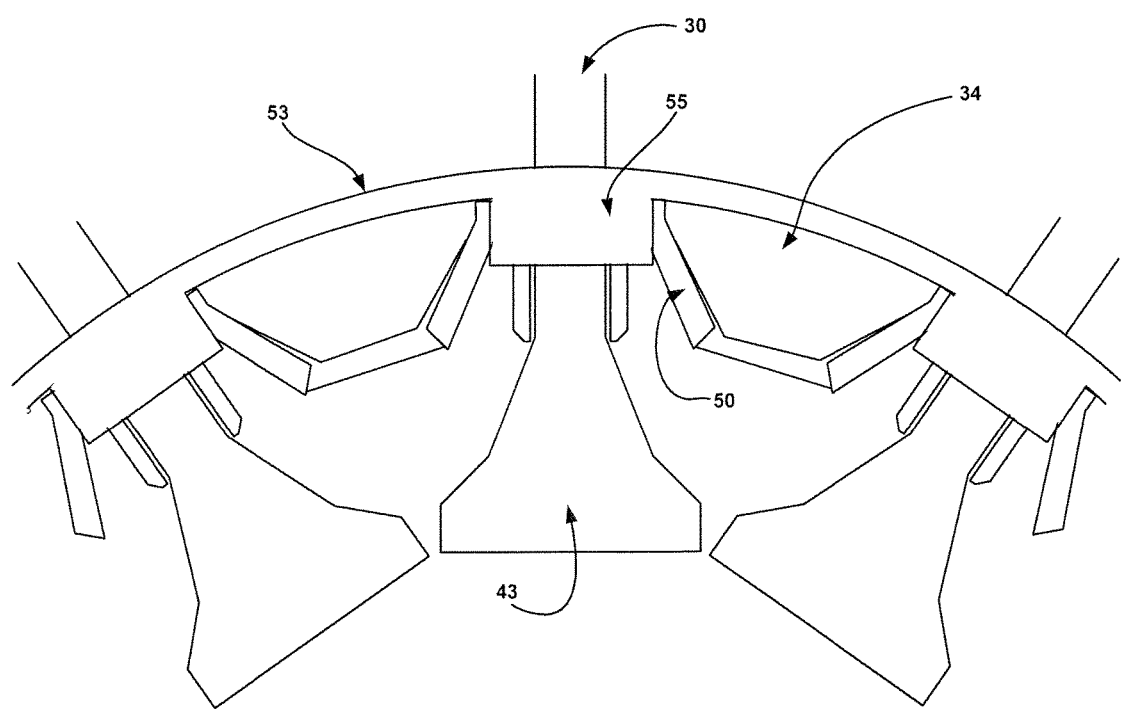
FIG. 5 is a forward view of the fan section, wherein the nosecone is not shown.

Returning to FIGS. 2-3 and with continued reference to FIG. 4, one or more platforms 34 may be associated with a flap seal 50, the flap seal 50 having a base secured to a side of the fan platform 34, and a flap integral with and extending from the base portion and canted toward the root 43 and engaging a blade 30. The flap seal 50 may be provided on the pressure side and/or the suction side of the airfoil 45. Alternatively, the flap seal 50 may extend about the perimeter of the airfoil 45 to extend around the leading and trailing edges 46, 47. Any other shape seal may be used as well, for example, a seal 50 may wrap about only one of the leading edge 46 or the trailing edge 47. The root 43 of the fan blade 30 may be received in a correspondingly shaped slot 57 of the fan hub 32, as seen in FIG. 5. When multiple flap seals 50 exist, the flap seals 50 may be connected by the platforms 34.

The flap seal 50 may be trimmed back at a leading edge 39 of the platform 34 to provide a smooth continuous surface for the spinner seal 53. In an embodiment of the fan section 11 of FIG. 5, wherein the spinner 31 is not shown, a spinner seal 53 is shown. The spinner seal castellation 55 may seal against the blade root 43 and flap seals 50, disallowing leakage around the entire blade root. The castellation 55 may be contoured to fit the blade root 43 and flap seals 50. The spinner seal 53 may include one or more castellations 55 to correspond with the locations of the blade root 43.

The flap seal 50 may be secured to the side or underside of the platform 34. The flap seal 50 may be constructed from an elastomeric material, such as a silicone rubber. Additionally or alternatively, the seal may be covered by a protective fabric that also aids in bonding. In some such examples, an adhesive may be applied to the fabric to secure the seal to the platform 34.

As illustrated in FIGS. 6-9, seals having various shapes and/or profiles may be used. However, it should be understood that other seal profiles may be used. Generally, the seals include flaps that are angled toward the root of the fan blade. As a result, the platforms may be installed more easily from a position radially outward from the fan hub since the flaps will deflect inward away from the fan blade during installation. The flaps load in the radial outward direction during engine operation, which may improve sealing against an adjacent fan blade.

Figure 6:
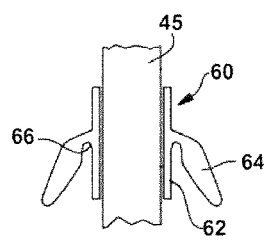
FIG. 6 is a cross-sectional view of one example fan blade and seal arrangement.
Figure 7:
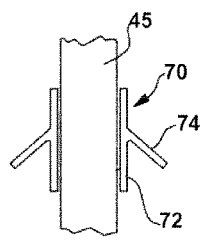
FIG. 7 is a cross-sectional view of another example fan blade and seal arrangement

In the exemplary embodiment of FIG. 6, a Y-shaped seal 60 is shown including a base 62, the base having an integral flap 64 extending toward the fan blade root. A notch 66 may be provided between the flap 64 and the base 62 to provide a weakened area that increases the flexibility of the flap 64 downward toward the root of a fan blade 30. An adhesive may secure the base 62 to the airfoil 45. In the alternative embodiment of a Y-shaped seal 70 of FIG. 7, the Y-shaped seal may have a base 72 and a flap 74, the flap 74 having a generally uniform thickness and being canted toward the root of a fan blade 30. The base 72 may be secured to the airfoil 45 by an adhesive. The larger base of the Y-shaped configuration may provide additional boding surface for the seal.

Figure 8:
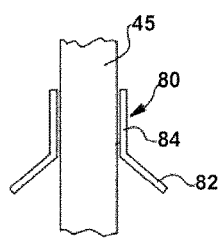
FIG. 8 is a cross-sectional view of yet another example fan blade and seal arrangement.
Figure 9:
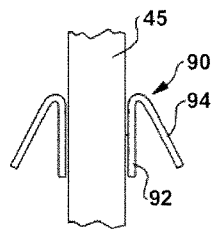
FIG. 9 is a cross-sectional view of yet another example fan blade and seal arrangement.

As illustrated in FIG. 8, a seal 80 may be generally L-shaped. A base 82 and a flap 84 of the L-shaped seal 80 may be oriented at an obtuse angle relative to one another. The base 82 may be secured to the airfoil 45 by an adhesive. Further, another example seal 90 is shown in FIG. 9, the seal 90 is a generally U-shaped seal 90 which has a smooth contour provided between the base 92 and the flap 94. The base may be secured to the airfoil 45 by an adhesive.

INDUSTRIAL APPLICABILITY

From the foregoing, it can be seen that the technology disclosed herein has industrial applicability in a variety of settings such as, but not limited to, sealing components of the fan section of a gas turbine engine. The gas turbine engine may be used in conjunction with an aircraft for generating thrust, or for land-based applications for generating power. The teachings of the present disclosure may provide greater efficiency in the engine by limiting airflow leakage within the fan section.

While the present disclosure has been in reference to a gas turbine engine and an aircraft, one skilled in the art will understand that the teachings herein can be used in other applications as well. It is therefore intended that the scope of the invention not be limited by the embodiments presented herein as the best mode for carrying out the invention, but that the invention will include all equivalents falling within the spirit and scope of the claims as well.

What is claimed is:

1. A fan section for a gas turbine engine comprising:
a fan hub having a slot;
a spinner secured to a forward end of the fan hub;
a fan blade including an airfoil extending from a root of the fan blade to a tip of the fan blade, wherein the airfoil has a leading edge and the root is received in the slot;
a platform secured to the fan hub and arranged between adjacent fan blades;
a spinner seal located between the spinner and the platform; and
a flap seal having a base secured to a side of the platform, and a flap integral with and extending from the base portion and canted toward the root and engaging the fan blade, the flap seal being trimmed at a leading edge of the platform and wherein the flap seal comprises a smooth continuous surface on which a castellation of the spinner seal directly contacts, wherein the castellation seals against the blade root and the flap seal to prevent leakage around the blade root.

2. The fan section of claim 1, wherein the castellation is contoured to fit the fan blade root and the flap seal.

3. The fan section of claim 1, wherein the flap seal has a generally U-shaped cross section.

4. The fan section of claim 1, wherein the flap seal has a generally Y-shaped cross section.

5. The fan section of claim 1, wherein the flap seal is generally L-shaped.

6. The fan section of claim 1, wherein the flap seal is constructed from an elastomeric material.

7. The fan section of claim 6, wherein the elastomeric material is a silicone rubber.

8. The fan section as in claim 1, wherein the flap seal further comprises a base and flap, wherein a notch is located between the base and the flap.

9. The fan section as in claim 1, wherein the flap seal wraps around a trailing edge of the fan blade.

10. A gas turbine engine, comprising:
a fan assembly section, the fan assembly section comprising:
a fan hub having a slot;
a spinner;
a fan blade including an airfoil extending from a root of the fan blade to a tip of the fan blade, wherein the airfoil has a leading edge and the root is received in the slot;
a platform secured to the fan hub and arranged between adjacent fan blades;
a spinner seal located between the spinner and the platform;
a flap seal having a base secured to opposing sides of the platform, and a flap integral with and extending from the base portion and canted toward the root and engaging the fan blade, the flap seal being trimmed at a leading edge of the platform and wherein the flap seal comprises a smooth continuous surface on which a castellation of the spinner seal directly contacts, wherein the castellation seals against the blade root and the flap seal to prevent leakage around the blade root;
a compressor section downstream of the fan assembly section;
a combustor section downstream of the compressor section; and
a turbine section downstream of the combustor section.

11. The gas turbine engine of claim 10, wherein the flap seal is generally L-shaped.

12. The gas turbine engine of claim 10, wherein the castellation is contoured to fit the fan blade root and the flap seal.

13. The gas turbine engine of claim 10, wherein the flap seal is constructed from an elastomeric material.

14. A method of sealing gaps between airfoils of fan blades and platforms in a fan section of a gas turbine engine, comprising:
positioning a flap seal between one of the platforms of the fan section and one side of one of the fan blades, wherein the flap seal is trimmed at a leading edge of the one of the platforms and wherein the flap seal comprises a smooth continuous surface that directly contacts a castellation of a spinner seal located between a spinner of fan section and the leading edge, wherein the castellation seals against a blade root of the one of the fan blades and the flap seal to prevent leakage around the blade root.

15. The method as in claim 14, wherein the flap seal wraps around a trailing edge of the one of the fan blades.

16. The method as in claim 14, wherein the flap seal further comprises a base and a flap, wherein a notch is located between the base and the flap.

17. The method as in claim 14, wherein the flap seal further comprises a base and a flap, wherein the base is secured to the one of the platforms.

18. The method as in claim 14, wherein the flap seal further comprises a base and a flap, wherein the base is secured to the one of the fan blades.

19. The method of claim 14, wherein the flap seal is generally L-shaped.

20. The method of claim 14, further comprising covering the flap seal in a fabric, the fabric being adhered to either the one of the fan blades or the one of the platforms.

* * * * *

UNITED STATES PATENT AND TRADEMARK OFFICE
CERTIFICATE OF CORRECTION

PATENT NO. : 10,047,625 B2
APPLICATION NO. : 14/401004
DATED : August 14, 2018
INVENTOR(S) : Royce E. Tatton Page 1 of 1

It is certified that error appears in the above-identified patent and that said Letters Patent is hereby corrected as shown below:

In the Specification

In Column 4, Lines 47 please delete "57";

In Column 4, Lines 48 please delete ", as seen in FIG. 5".

Signed and Sealed this
First Day of December, 2020

Andrei Iancu
*Director of the United States Patent and Trademark Office*